(12) United States Patent
Pacheco Hernandez

(10) Patent No.: US 11,975,235 B2
(45) Date of Patent: May 7, 2024

(54) CYCLING OR MOTORCYCLING SIMULATOR FOR RECREATION AND PHYSICAL EXERCISE

(71) Applicant: Wilson Hernan Pacheco Hernandez, Cundinamarca (CO)

(72) Inventor: Wilson Hernan Pacheco Hernandez, Cundinamarca (CO)

( * ) Notice: Subject to any disclaimer, the term of this patent is extended or adjusted under 35 U.S.C. 154(b) by 207 days.

(21) Appl. No.: 17/437,319

(22) PCT Filed: Mar. 18, 2020

(86) PCT No.: PCT/IB2020/052487
§ 371 (c)(1),
(2) Date: Sep. 8, 2021

(87) PCT Pub. No.: WO2020/254880
PCT Pub. Date: Dec. 24, 2020

(65) Prior Publication Data
US 2022/0176197 A1 Jun. 9, 2022

(30) Foreign Application Priority Data

Jun. 21, 2019 (CO) .................. NC2019/0006686

(51) Int. Cl.
*A63B 22/06* (2006.01)
*A63F 13/245* (2014.01)
*A63F 13/803* (2014.01)

(52) U.S. Cl.
CPC ........ *A63B 22/0605* (2013.01); *A63F 13/245* (2014.09); *A63B 2022/0641* (2013.01); *A63F 13/803* (2014.09); *A63F 2300/1062* (2013.01)

(58) Field of Classification Search
CPC ........ A63B 22/0605; A63B 2022/0641; A63B 21/005; A63B 21/0054; A63B 21/0055;
(Continued)

(56) References Cited

U.S. PATENT DOCUMENTS 4,711,447 A 12/1987 Mansfield
4,887,967 A 12/1989 Letovsky et al.
(Continued)

FOREIGN PATENT DOCUMENTS

CN 206434843 U 8/2017
CN 110935136 A 3/2020
(Continued)

*Primary Examiner* — Andrew S Lo
*Assistant Examiner* — Andrew M Kobylarz
(74) *Attorney, Agent, or Firm* — Hoglund & Pamias, PSC; Roberto J. Rios

(57) ABSTRACT

The present invention discloses a cycling or motorcycling simulator for recreation and physical exercise characterized by allowing left, right, and backward movements and tilts that can be controlled with the handlebars or body thrust. Structurally, the device of the present invention is divided mainly into six parts interconnected to get the device to function optimally. Thus, the simulator consists of i) a base that supports the other systems of the invention, ii) a mounting base that allows coupling the lifting system, the lower coupling system, and the lateral tilt system, iii) a frame giving a bicycle-shaped structure to the simulator, iv) a lifting system, v) a lateral tilt system, and vi) a lower coupling system; wherein the said systems control the turns and the tilt of the simulator. Because the present invention allows a greater range and variety of movements, the monotony of the exercise is reduced, and the user can exercise a greater number of muscles.

16 Claims, 10 Drawing Sheets

(58) Field of Classification Search
CPC .... A63B 2024/0096; A63B 2071/0063; A63B 24/0087; A63B 21/225; A63B 2220/24; A63B 69/00; A63F 13/245; A63F 13/803; A63F 2300/1062; G09B 9/00; G09B 9/058

See application file for complete search history.

(56) References Cited

U.S. PATENT DOCUMENTS

| | | |
|---|---|---|
| 5,364,271 A | 11/1994 | Aknin et al. |
| 7,963,889 B2 * | 6/2011 | Badarneh ............ A63B 26/003 |
| | | 482/61 |
| 8,371,992 B2 | 2/2013 | Irving et al. |
| 10,561,877 B2 * | 2/2020 | Workman .......... A63B 22/0046 |
| 2009/0048076 A1 | 2/2009 | Irving et al. |
| 2011/0195820 A1 * | 8/2011 | Irving .............. A63B 21/00076 |
| | | 482/57 |
| 2011/0287902 A1 * | 11/2011 | Bingham, Jr. ......... A63B 69/16 |
| | | 482/61 |
| 2015/0290490 A1 * | 10/2015 | Badarneh ......... A63B 21/00076 |
| | | 482/57 |
| 2017/0001065 A1 * | 1/2017 | Irving ................ A63B 21/4034 |
| 2017/0072254 A1 | 3/2017 | Ryu et al. |

FOREIGN PATENT DOCUMENTS

| | | |
|---|---|---|
| KR | 20190124 | 1/2019 |
| WO | 1992016267 A2 | 10/1992 |

\* cited by examiner

CYCLING OR MOTORCYCLING SIMULATOR FOR RECREATION AND PHYSICAL EXERCISE

FIELD OF THE INVENTION

The present invention is in the field of devices that simulate physical exercise and more particularly it refers to a recreation and physical training simulator that enables users to perform movements and controlled inclinations.

BACKGROUND OF THE INVENTION

Cycling is one of the physical activities preferred by people who carry out some physical activity as it allows the development of cardiorespiratory and muscular skills. Moreover, it is widely known that cycling improves muscular tone, prevents the appearance of arthrosis, fosters a healthy heart, and delays aging. In addition to strengthening the body, cycling prompts hormone release improving mood and generating a feeling of peacefulness.

Although millions of people use bicycles daily in streets, tracks, or mountains, stationary bicycles for physical training are now gaining more popularity. Stationary bicycles are devices that simulate a bicycle but allow the same physical results to be obtained in enclosed environments. The main advantage of stationary bicycles over conventional ones is that they allow users to exercise from the comfort of their homes or gym without falling off, encountering bad weather, or crowded streets. Likewise, stationary bicycles allow controlling exercise intensity depending on the physical aptitudes of the user. So, it is possible to set up resistance levels that would not be possible to get on a standard bicycle on regular terrain.

On the other hand, pedaling the stationary bicycle provides the means to work on the muscles in the lower part of the body. Quadriceps and sural triceps are constantly exercising, and whenever the user presses the pedals, the gluteal muscles exercise separately. With an increase in pedaling resistance, those muscles must exert greater force, developing more muscle mass.

Despite the many advantages of stationary bicycles, the abdominal, back, and upper limb muscles are worked to a lesser extent on a stationary bicycle. Hence, the designs of conventional stationary bicycles fail to engage those muscle groups exercised while pedaling a conventional bicycle, including the muscles required for propulsion and balance of the bicycle and those used when the user changes direction.

In the same way, conventional stationary bicycles offer a limited experience to the user because they simulate a reduced amount of the total dynamic forces that a user faces when riding a traditional bicycle. Hence, continuous pedaling in a static position can be tedious and monotonous, leading to the search for new configurations that allow a more authentic experience for the user.

Simulators allowing tilting of the bicycle to rotate on an axis located directly underneath the user are disclosed in publications such as U.S. Pat. Nos. 4,887,967 and 4,711,447. The invention of U.S. Pat. No. 5,364,271 shows a cycling simulator that electronically connects the mechanical support assembly to a computer to simulate physical activity more realistically on different types of terrain and tracks. The simulator allows users to have the chance to do "wheelies" through a distinctive feature in which the bicycle rotates in a backward direction on an axle close to the rear wheel.

U.S. Pat. No. 8,371,992 B2 shows a device that simulates riding a bicycle. The simulator comprises two mounting points that hold the frame, which is configured to pivot about the first and the second mounting point in response to user movement. Consequently, the two mounting points allow the rider to move the entire frame and its components from left to right and tilt the bike within the stationary frame in response to forces applied to the handlebars and pedals.

Although the state of this technique has achieved relevant breakthroughs, there is still a need for cycling or motorcycling simulation systems that allow more muscles to work simultaneously (legs, central core, arms, upper muscles, etc.). Therefore, this requires systems that allow users to perform more movements of different kinds during the same experience.

Similarly, there is a market for simulation systems that involve a new way of physical exercise and recreation to avoid desertion and monotony. As a result, it is necessary to develop systems that allow users to perform movements and inclinations with greater freedom. It is also indispensable that simulators allow a single experience to perform lateral and backward movements and tilts without incorporating motors or driven cylinders.

SUMMARY OF THE INVENTION

Accordingly, the present invention discloses a cycling or motorcycling simulator for recreation and physical exercise characterized by allowing left and right movements and inclinations that can be controlled with the handlebars or body thrust.

The simulator of the present invention also allows tilting backward to simulate wheelies without using motors or driven cylinders since all its movement is due to the effort and balance of the user. Thus, simulating an actual bicycle or motorcycle.

Additionally, the present invention has a greater range and possible movements and, therefore, it reduces the monotony of exercise and allows the user to perform aerobic or cardiovascular training.

The simulator of the invention makes possible to perform anaerobic exercises to work more muscles than on a conventional exercise bike. Such as legs, thighs, abdomen, back, arms, and forearms.

Another advantage of the invention is its convenience, as it does not take up more space than a conventional stationary bicycle. So, it can be used at home or in the gym, and users can adjust it to match their height.

From a structural perspective, the device of the present invention allowing the simulation of cycling or motorcycling movements is divided into six parts. These are connected to each other to get the device to function optimally.

In first place, the simulator consists of a base (1) supported on the floor holding all the parts of the invention. This base can be formed by two metal profiles parallel to each other joined at each end to two other metal profiles located perpendicularly. In another embodiment, the base can be circular or oval.

The second part corresponds to a mounting base (2) mounted on the base (1). On the mounting base (2), the weight of the simulator is concentrated when it is on the base (1) or does not have the lifting system (3), but when it is raised, the weight is concentrated on the lifting system (3). The mounting base (2) consists of profiles that fit on a rectangular sheet to give it the shape of an inclined box. The mounting base (2) may have holes in its lower part to screw lower shock absorbers (3d). These same holes are used to screw the mounting base (2) to the base (1) if the user wants to disable the lifting system (3).

The mounting base (2) was specially designed to attach the lifting system (3), the lower coupling system, and the lateral tilt system (6) so that the simulator can be simultaneously rotated to the left or the right while being lifted. On its rear side, the mounting base (2) has a lower rectangular cavity (2a) with a frame protruding from the housing for the coupling of the lifting system (3), and above this cavity has a circular hole for the adjustment of the main shaft (5). While on its front side, it has a lower hole of circular shape for the adjustment of the central axis (5). In one possible embodiment, the front side has a top opening to adjust the lateral tilt system.

The third part of the simulator corresponds to the lifting system (3), consisting of a lifting profile (3a) connected to a rotating shaft (3b) and bushings or bearings (3c) with supports or bearings (3g) connected to the base (1) by screws and positioned at the ends of the rotating shaft (3b), to allow rotation and lifting for the lifting system (3). In addition, such a system may consist of lower shock absorbers (3d) or any element attached to the mounting base (2) to cushion or soften the fall after lifting the bicycle, simulating that it was on the rear tire, which is called doing a wheelie or a rocking horse like movement. Finally, the lifting system (3) may consist of adjustment support (3e) positioned around the lifting profile (3a) and preferably attached to the base (1) using screws. This support allows for adjusting the angle and the maximum lifting height of the stationary bicycle.

The lifting system (3) works when the user pushes its body backward or jumps by pulling the handlebars toward its body, thus changing the machine's center of gravity to lift the bicycle and achieve wheelies without using motors or driven cylinders. In addition, the lifting system (3) can be adjusted so that when the lifting profile (3a) enters further into the mounting base (2) and thus facilitating the lifting of the simulator. Similarly, when the lifting profile (3a) enters less into the mounting base (2), more effort is required to lift the simulator.

The fourth part of the invention corresponds to the frame (4), which is made up of profiles giving a bicycle-shaped structure to the simulator allowing the union of other parts of the frame that correspond to handlebars (11), a resistance element (8), the pedals (7), the seat (10), lateral shock absorbers (9) and the braking mechanism (29).

In a preferred aspect, the frame comprises two connecting profiles (4a) (4b) The profile A (4a) attaches the handlebar (11) to the lateral tilt system (6) and is coupled inside the mounting base (2) and anchored to the main shaft (5). Likewise, the frame (4) is constituted by profile B (4b), which is coupled to the main shaft (5) outside the mounting base (2), to the profile C (4c).

In another preferred embodiment, the bicycle frame (4) also includes a resistance element (8) located at the rear, which produces resistance when pedaling. By way of example, and without limiting the invention, the resistance element (8) can consist of a flywheel weighing 13 to 30 kg.

In an embodiment of the invention, the rear resistance element (8) can include, by way of example: an inertia flywheel, a disk, a wheel, a roller, geared wheels, a simulator already existing in the market that can be adapted, or some system or mechanism that generates resistance to the user when pedaling without affecting the mobility features of the bicycle.

In a preferred embodiment, the bicycle frame (4) consists of pedals (7) that interact, for example, by chain or belt transmission with the rear resistance element (8) to generate movement.

In one possible embodiment of the invention, the frame (4) consists of footrest supports instead of pedals that serve when users want to simulate devices other than a bicycle such as a motorcycle, jet ski, or an animal for video games.

In another preferred embodiment, the lateral shock absorbers (9) stabilize the simulator by preventing the bicycle from tipping sideways and help the user to keep the simulator centered more easily. These lateral shock absorbers (9) are located on the lower sides of profile A (4a) inside the mounting base (2). Screws hold them on the sides of profile A (4a). The side shock absorbers (9) can be springs or elastomers. These are necessary if the lateral tilt system (6) is not used or is disconnected from the handlebars (11). In this case, the user will tilt the bicycle by pushing its body sideways. The side shock absorbers (9) will help to return it to a centered position.

In a preferred embodiment, the seat (10) is adjustable in both distance and depth. Moreover, it is interchangeable, and the user can put on the seat that suits their preferences in size, shape, material, and color.

In another preferred aspect, the handlebar (11) is adjustable in both height and depth and is clamped to an orientation tube (14) that is held from the frame (4) by fixed clamps or rings (20a) and pivots on bushings or bearings (20). With the handlebar connected to the lateral tilt system (6), the user can control the tilting or turning movements of the simulator to move it in all the different possible rotation angles. It is also possible to disable the lateral tilt system and leave the handlebar fixed or fix it with the knob (30) to the frame (4) to prevent it from rotating.

In a preferred embodiment, the handle may have any steering wheel shape, such as the steering wheel for a ship or car, among others.

In a preferred embodiment, the braking mechanism (29) makes it possible to brake the rear resistance element (8) and thus regulate the effort made by the user when pedaling. For this purpose, there is a braking or resistance regulation knob (28), which, when turned, tightens, or loosens a cable so that the clamps exert pressure on the rear resistance element (8). Thus, requiring more or less pedaling force. This braking mechanism can be mechanical with a plug, magnetic skid, or electromagnetic induction. In addition, it can be driven manually or automatically with a motor or other device.

The fifth part of the stationary bicycle is the lower coupling system that allows the connection of profile A (4a) with profile B (4b). This system consists of the main shaft (5) that crosses the lower ends of both profiles. This shaft can rotate on a support structure (12), bushings or bearings (17), or any element that allows its rotation.

The main shaft (5) of the lower coupling system forms a fixed angle (B) for the base (1) of 25 to 45 degrees when the mounting base (2) is positioned on the base (1) without forming any angle of elevation. When the lifting system (3) is raised, the angle (B) varies depending on the force applied by the user to perform wheelies. Along with that, when the user turns the handlebars (11) to the left or right, the main axle (5) rotates on the supports (12), bushings, or bearings (17), allowing for tilting or turning the whole bicycle to the left or right.

Finally, the sixth part of the invention corresponds to the lateral tilt system that allows the user to turn the bicycle to the left or right with different degrees of freedom. This system comprises of an upper flap (13) that includes an opening, two spherical plain bearings and rod ends or coupling levers, one upper (6a) and (6b), and two coupled at the bottom (6f) (6g) or (18b)(18c), a rotating tube (6d) and a lower shaft (15) or coupling (18d).

In a preferred embodiment, the upper flap (13) corresponds to a ring-shaped part welded or clamped to the lower part of the guide tube (14) of the handlebar (11). The flap (13) includes a hole with an upper spherical plain bearing (6a) through a shaft or screw for engaging.

In a preferred embodiment, the upper spherical plain bearings (6a) and (6b) are joined by a coupling or screw at the center. The ball joint (6a) engages the upper flap (13), and the ball joint (6b) engages an upper lever (6c) that is part of the rotating tube (6d).

In a preferred aspect of the invention, the rotating tube (6d) is located parallel to profile A (4a) and rotates on its axis, as a result, of the upper (16a) and lower (16b) connecting pieces that are anchored to the profile (4a) keeping the tube (6d) fixed but allowing its rotation. The tube (6d) has levers set perpendicularly. At its upper end, a lever (6c) is welded to it, and at its other end, the lower lever (6e) or (18a) is fixed to it.

In another preferred embodiment of the invention, the lower ball joint (6f) or (18b) fits into the lower lever (6e) or (18a), which is part of the rotating tube (6d) and the lower ball joint (6g) or (18c) is coupled to the lower shaft (15) or coupling (18d) which is fixed or anchored to the mounting base (2).

The device of the invention has other uses different from the stationary bicycle. For example, different electronic systems are attached to the stationary bicycle in one embodiment, allowing the measurement of different variables while exercising or as a video game simulator. Some adaptations are the handlebar button box, brakes with sensors, throttle handle, steering control, jump sensor, inclination sensor, pedal sensors, maximum inclination sensor, and braking motor.

In a possible embodiment, the stationary bicycle has control boxes with buttons on the handlebars. These control boxes allow users to activate different abilities or options that other video games have.

In another embodiment, the stationary bicycle has two brakes adapted (22) on the handlebars (11), which have sensors that simulate the braking in a bicycle video game or the clutch in a motorcycle game. These brakes can have housings similar to conventional bicycle brakes to give a realistic feel to the game. Similarly, the handlebar (11) can have an adapted throttle handle (33) to simulate motorcycle games, where the movement of the handle activates a sensor that allows accelerating in the video game.

In one of its embodiments, the invention has coupled a direction control commanding left, and right turns for the video game character. For these turns, a potentiometer can be used with geared wheels attached to the handlebars. In this way, when the handlebars are turned, the gear wheel of the handlebars will turn the gear wheel of the potentiometer, sending the signal to the video game for the character to make the turn. For direction control, it is also possible to use any sensor that allows sending the signals to control the turns in the video game.

In one embodiment, the stationary bicycle has a jump sensor that interacts with the lifting system (3) or the mounting base (2). This sensor will signal the program or video game to indicate that the user has lifted the bicycle from the base (1), interpreted as a jump in the video game.

The stationary bicycle may have in one embodiment a lift sensor located on the sides of the lifting bracket (3e) or activated using the rotating shaft (3b). The sensor could send a signal that the video game processing will interpret to activate the different skills of the video game character.

In another possible embodiment, the invention has sensors on the pedals which can send two signals, one when pedaling forward and thus accelerating the bicycle, and another, when pedaling backward, which would reverse the bicycle. This mechanism can be developed using an optocoupler or any electronic system that allows sending impulses or signals to a processing block, differentiating one signal when the pedals are rotating, simulating a forward pedaling from another signal when performing backward pedaling.

The device of the invention in one embodiment has coupled lateral tilt sensors, which allow knowing the angle of lateral movement of the bicycle. In addition, it can have two maximum tilt sensors, one on the left and one on the right, which will detect when the bicycle has been tilted to the maximum sideways. Such sensors are useful for different video games.

A motor acting accordingly to the programming commands and requirements of the video game can be installed on the braking system of the invention. Furthermore, this motor will adjust the jaws, apply pressure, or bring a magnetic field over the resistance element (8) to prevent easy pedaling when the video game presents scenes of climbing hills or when the user has to make a greater pedaling effort.

In a possible embodiment, the stationary bicycle can include two accessories to move it easily. The first accessory is a handle at the front of the base (1) to lift the bicycle so that it rests on the bicycle's transport wheels installed underneath or at the rear of the base.

The stationary bicycle includes a base for positioning a PC keyboard and/or mouse or a video game controller in another possible embodiment.

The invention in one embodiment can have an existing electric power generator or dynamo on the market, coupled to the rear resistance element (8), to transform the kinetic energy produced by pedaling into electrical energy. This energy can have different uses, such as to charge a battery, a mobile device, or use it for some electrical operation of the bicycle itself.

The simulator can include in one embodiment a system to simulate the descents and climbs of a mountain that would consist of a fixed platform. It would be installed under the support or bearings (3g) to further raise the simulator with respect to the base (1) that goes on the ground. Furthermore, a second mobile platform under the mounting base (2) whose function is to raise or lower the simulator from the front and the mobile platform could be driven by an electric motor, a worm gear, hydraulic cylinders, or any available system allowing such a function. This mobile platform can be programmed with a video game or sports training application to rise when users simulate a mountain ascending or descending. It can also make a quick upward or downward movement to simulate uneven terrain, making the experience more realistic for the user.

In one aspect, the simulator can include devices for wind and water simulation. The wind would be simulated by the installation of a fan, so the user receives wind in its face according to the cyclist's pedaling speed or the speed it is riding at, in the video game. Likewise, a small water pump or some other system can be added to throw a little water towards the user when there are rainy areas in the video game or when passing over water.

The invention can be fitted with a mechanism to simulate uneven or rocky terrain using a motor or vibrator connected to a computer via a control card and to the mounting base (2), the base (1), or the lifting system.

In another possible embodiment, an activation system can be added to the simulator to introduce some form of payment when used in a commercial setting.

In another embodiment, the simulator's frame structure can be modified so that the design is in the shape of a character, animal, or sports device such as dolphins, birds, horses, motorcycles, ATVs, jet skis, among others. Any device on which the user can get on and control the handlebars by hand or pulling a strap. Also, the handlebar can be shortened, and a strap can be attached to control animal-shaped devices. The user pulling the right strap will turn the handlebar to the right, and if the user wants it to return will have to pull the left strap. To lift the simulator, the user will pull both straps simultaneously and by pulling its body backward.

BRIEF DESCRIPTION OF THE DRAWINGS

For the present invention to be understood and put into practice, the attached figures, and a detailed description of embodiments of the invention are referenced as follows.

DETAILED DESCRIPTION OF THE EMBODIMENTS

Figure 1:
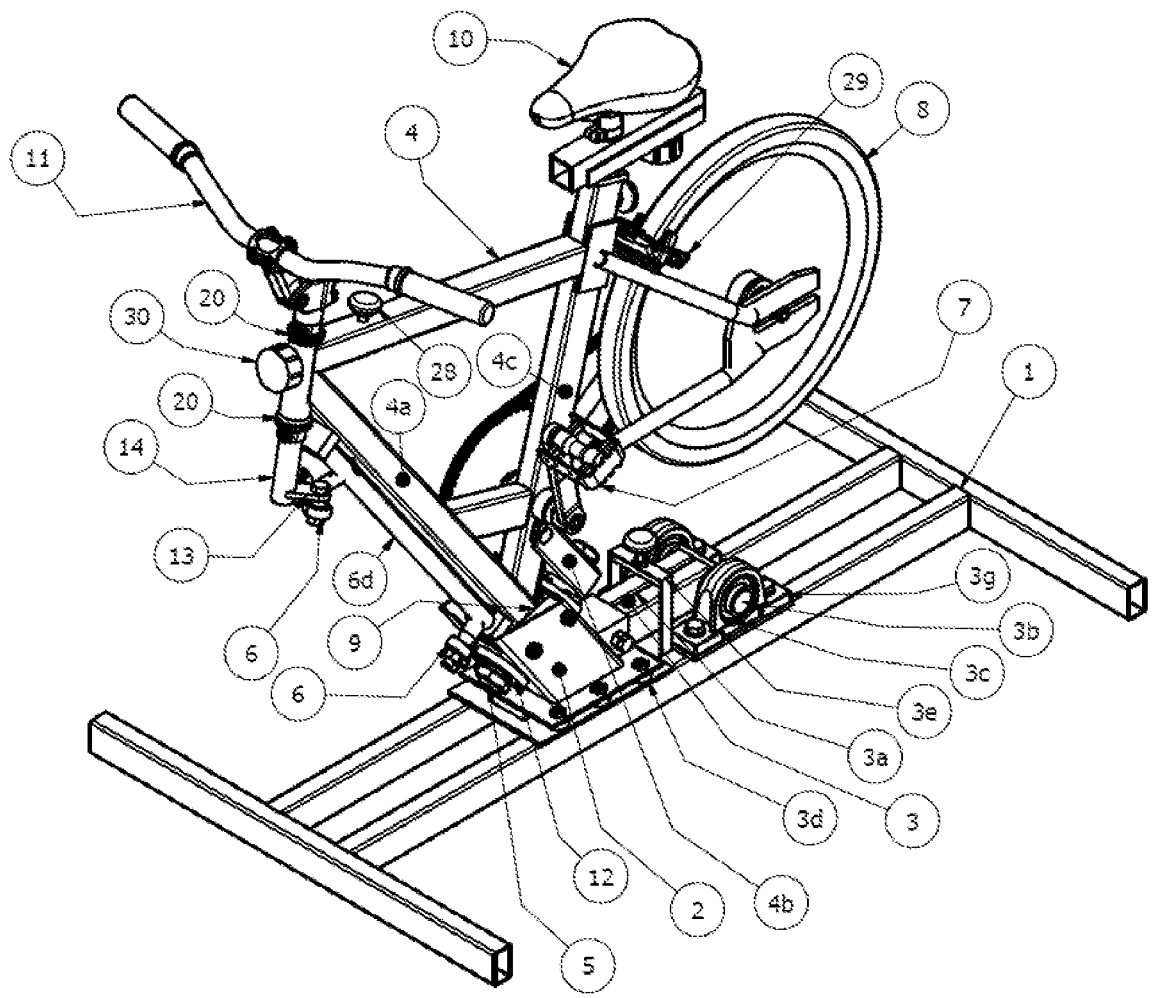
FIG. 1 shows a front view of the simulator of the present invention.
Figure 2:
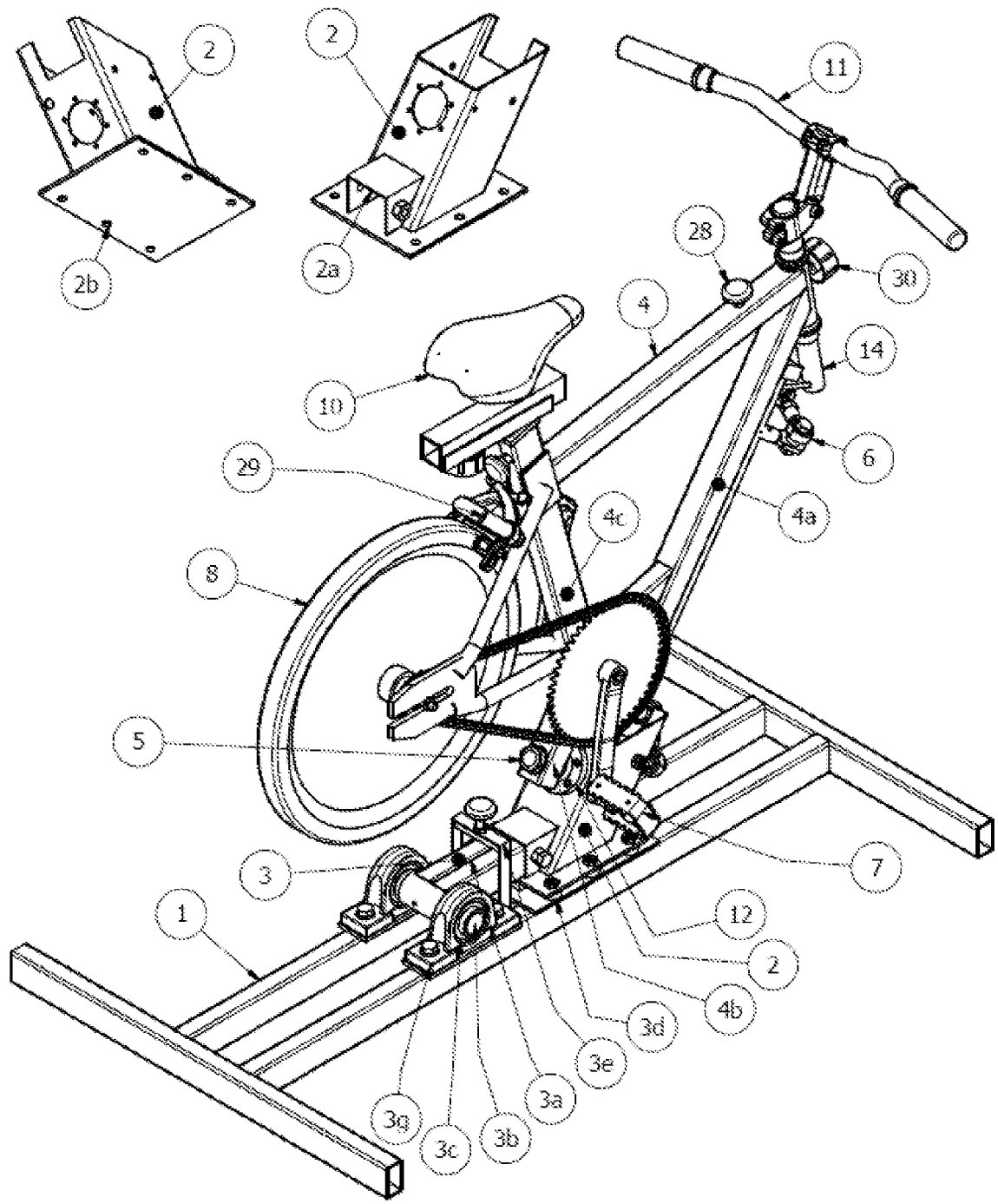
FIG. 2 depicts a rear view of the simulator of the present invention together with a detailed image of the mounting base (2).

In general terms, the invention depicted in FIGS. 1 and 2 shows the six structural parts of the simulator. From the images, it is possible to locate structurally (i) the base (1) that supports all the systems of the invention, (ii) the mounting base (2), which is arranged on the base (1) and allows the coupling of the lifting system (3), the lower coupling system and the lateral tilt system (6), (iii) a lifting system (3), (iv) a frame (4) that gives the simulator a bicycle-shaped structure, (v) a lower coupling system that allows the union of two profiles (4a and 4b) for the proper inclination or rotation of the bicycle and (vi) a lateral inclination system (6) that the rotation of the bicycle with different degrees of freedom.

Specifically, FIG. 2 shows the configuration of the mounting base (2). The mounting base (2) comprises a lower rectangular cavity (2a) for the coupling of the lifting system (3) and a circular hole above this cavity for the adjustment of the main shaft (5). On the front face of the rectangular cavity is located a lower hole of circular shape for the adjustment of the central axis (5). The front face of the rectangular cavity may also comprise a top opening for adjustment of the lateral tilt system. Thus, the mounting base (2) of the present invention is specially designed to couple the lifting system (3) the lower coupling system and the lateral tilt system (6) to rotate the simulator to the left or right while it is in a tilted position.

In FIGS. 1 and 2, it is possible to observe the elements that compose the frame (4) or structural element of the simulator of the present invention. This frame is composed of two profiles (4a) (4b) that give the simulator a bicycle-like structure and allow the attachment of other structural components such as the handlebars (11), the rear resistance element (8), such as a flywheel, the pedals (7), the seat (10), lateral shock absorbers (9) and the braking mechanism (29).

As for the structural elements of the frame (4), the pedals (7) interact with the rear resistance element (8), the lateral shock absorbers (9) are intended to stabilize the bicycle, the seat (10) can be adjusted to the user's build. The brake mechanism (29) can be mechanical, magnetic, or by electromagnetic induction. The handlebar (11) can control the tilting or turning movements of the bicycle if the orientation tube (14) is connected to the lateral tilt system (6) through the upper flap (13).

From FIGS. 1 and 2, it is also evident that both profiles (4a) (4b) are anchored to the main axis (5) of the simulator. However, while profile A is positioned inside the mounting base (2), profile B is anchored outside the mounting base (2). The fastening between the profiles (4a) (4b) and the main shaft (5) can be done using wedges, grub screws, or other fastening elements.

Figure 3A:
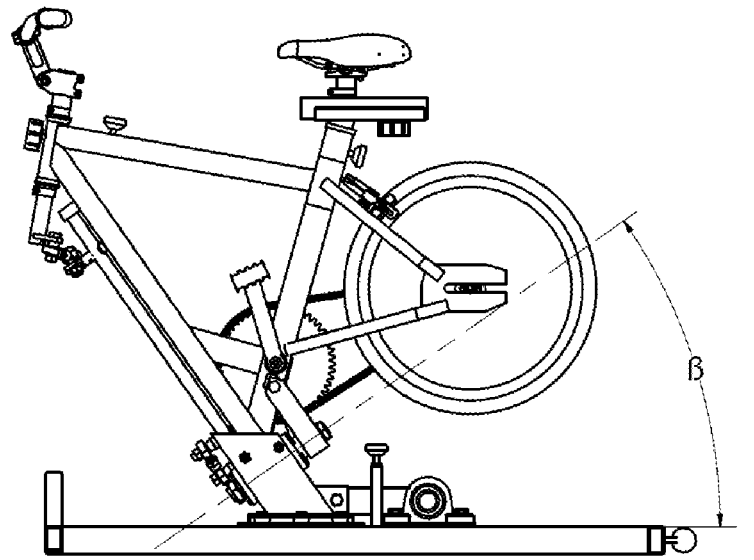
FIG. 3a shows the side views of the lifting system (3) of the simulator of the invention with and without elevation angle.
Figure 3A:
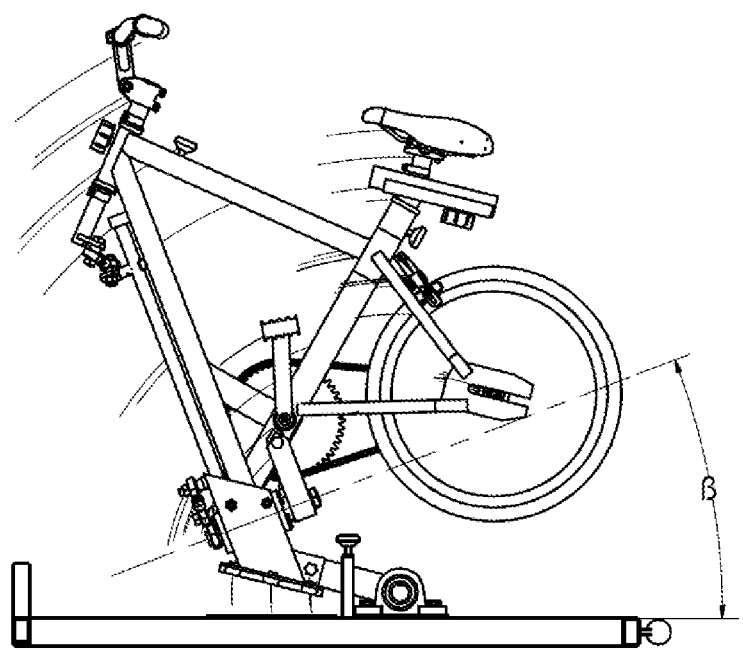
Figure 3B:
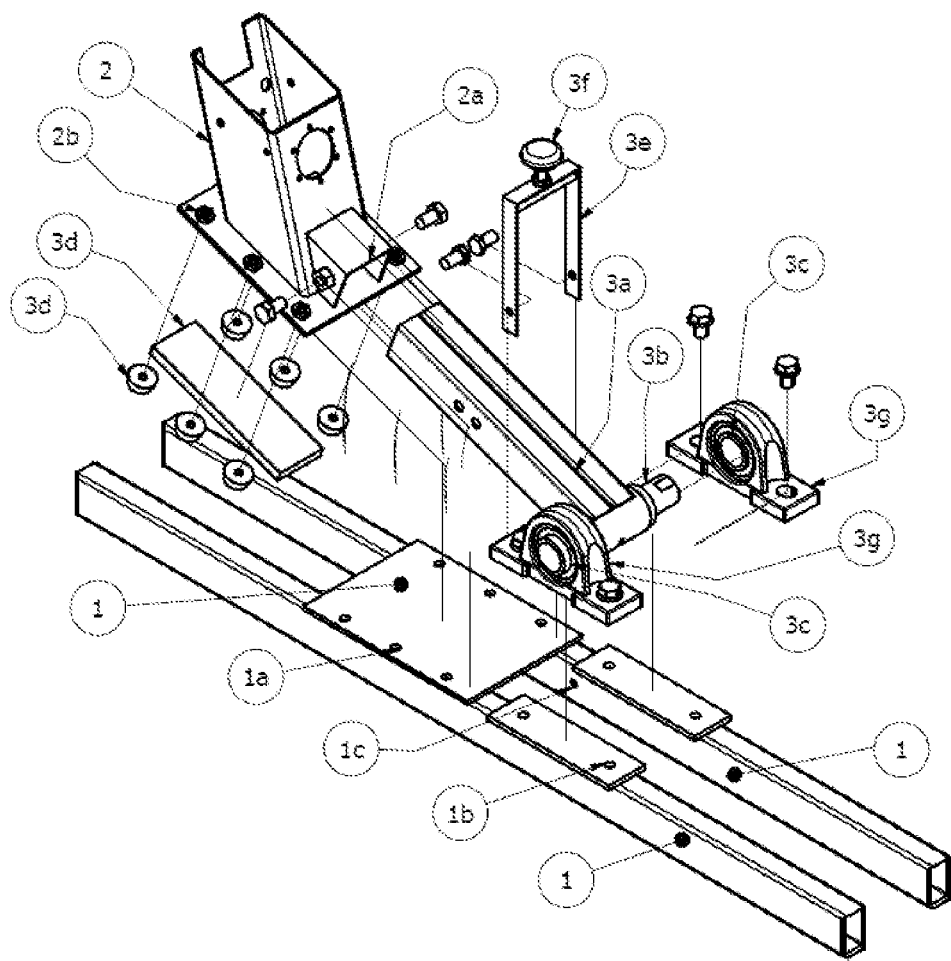
FIG. 3b shows an exploded view of the lifting system (3), the mounting base (2), and part of the base (1).

FIGS. 3a and 3b show the structural elements that make up the simulator's lifting system. Innovatively, the lifting system of the invention is triggered when the user pushes its body backward; this shifts the machine's center of gravity so that it is possible to lift it (FIG. 3a) and perform acrobatics.

From FIGS. 1, 3a, and 3b, it is possible to evidence that the lifting system (3) contains a lifting profile (3a) attached to a rotating shaft (3b), bushings or bearings (3c) with supports or bearings (3g), or any element that allows rotation. These elements are positioned at the ends of the rotating shaft (3b) fixed or screwed to the holes (1b) of the base (1). In addition, the simulator may consist of a group of lower shock absorbers (3d) located under the mounting base (2) to cushion or soften the fall after simulating that the bicycle is raised on the rear tire (called wheelie). Also, the lifting system (3) can have a support structure (3e) which is attached to the holes (1c) of the base (1) preferably by screws and positioned around the lifting profile (3a). The support (3e) may have a knob (3f) for graduating the angle and the maximum lifting height of the lifting system (3).

It is worth noting that the lifting system (3) of the invention can be removable depending on each user's particular needs and requirements. In this way, the lifting system (3) can be fixed or disabled by coupling/decoupling the lower holes (2b) with the holes (1a) of the base using screws.

In FIG. 3a, it is possible to evidence two embodiments of the invention. In the first case, the main shaft (5) has a mounting inclination that forms an angle (B) in relation to the base (1) of 25 to 45 degrees. In consequence, this occurs when the mounting base (2) is positioned on the base (1) with no elevation angle. In the second case, when the lifting system (3) is raised, and an elevation angle is formed between the mounting base (2) and the base (1), the angle (B) of the main shaft (5) varies depending on the force applied by the user.

FIG. 3b shows an exploded view of the lifting system (3), where the lower shock absorber group (3d) may have some form of polymer or springs, fixed or screwed to the lower holes (2b) of the mounting base (2). Moreover, the lower holes (2b) can also be used to screw the mounting base (2) to the holes (1a) of the base (1) to fix or disable the lifting system (3).

Figure 4:
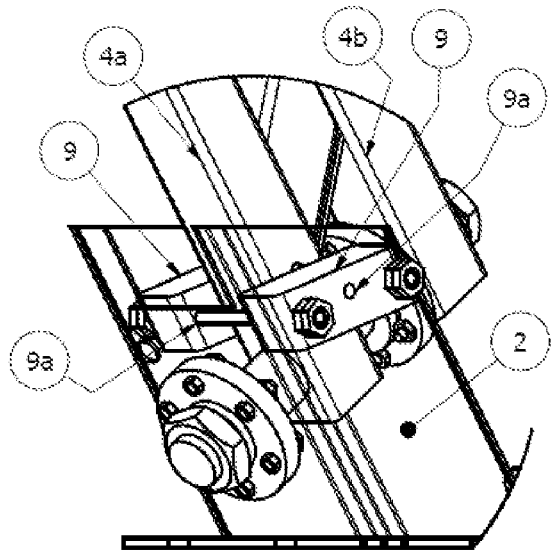
FIG. 4 discloses the arrangement of the lateral shock absorbers (9) in the simulator.
Figure 4:
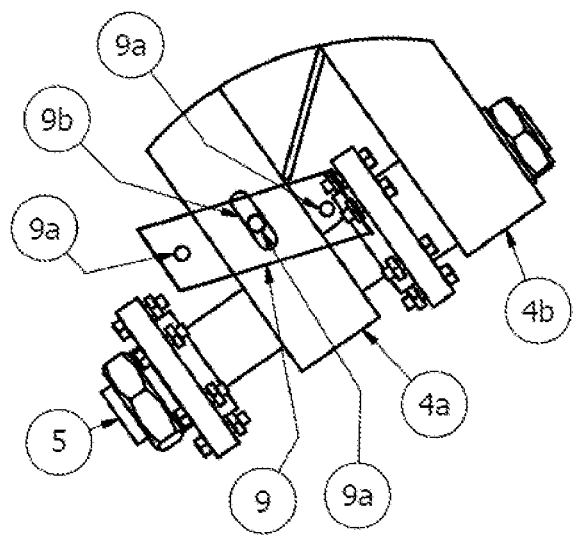

In FIG. 4, it is possible to see that the shock absorbers (9) are located on the lower sides of profile A (4a) inside the mounting base (2). They are held by screws that go through the holes (9a) and end up screwed to the mounting base (2). From FIG. 4, it is also possible to observe that profile A (4a) can optionally have a groove (9b) through which a coupling screw can also pass. The shock absorbers (9) can be springs or elastomers, and they can help manipulate the simulator. However, they are unnecessary when the simulator is controlled by the handlebar (11) and the tilt system (6). On the contrary, if the tilt system (6) is disabled, the lateral shock absorbers (9) are necessary as the user will tilt the bicycle by pushing its body sideways. The shock absorbers will help the user to return to a centered position.

Figure 5:
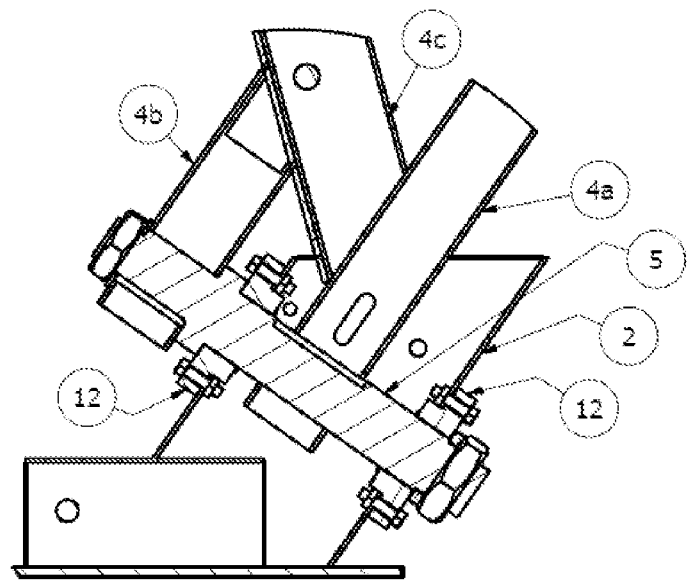
FIG. 5 allows visualizing the bottom coupling system (5) and the possible pivoting elements constituting the bottom coupling system of the invention.
Figure 5:
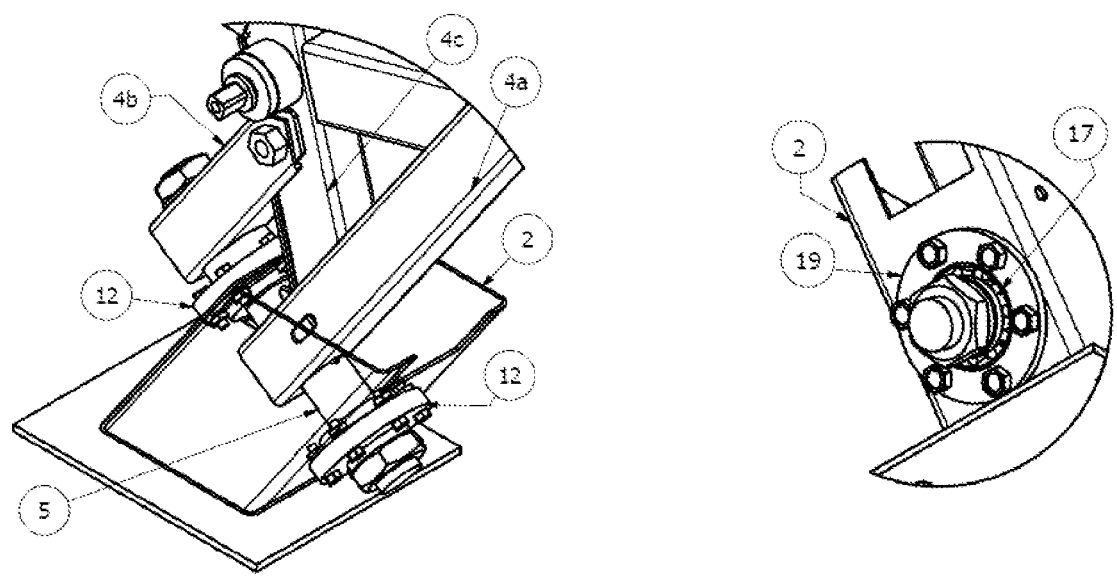

FIG. 5 shows the lower coupling system of the simulator of the invention. The function of this system is to join profile A (4a) with profile B (4b) and includes the main axis (5) that crosses the lower ends of both profiles.

The main shaft (5) that constitutes the lower coupling system rotates on any element that allows the main shaft (5) to rotate. That element can include either supports (12) anchored by screws to the base (2) or bushings or bearings (17) located within a support structure (19) anchored to the base (2). The main shaft pivot (5) allows the bicycle to tilt or turn to the left or right when the user turns the handlebars (11) or applies some force by pushing its body.

Figure 6A:
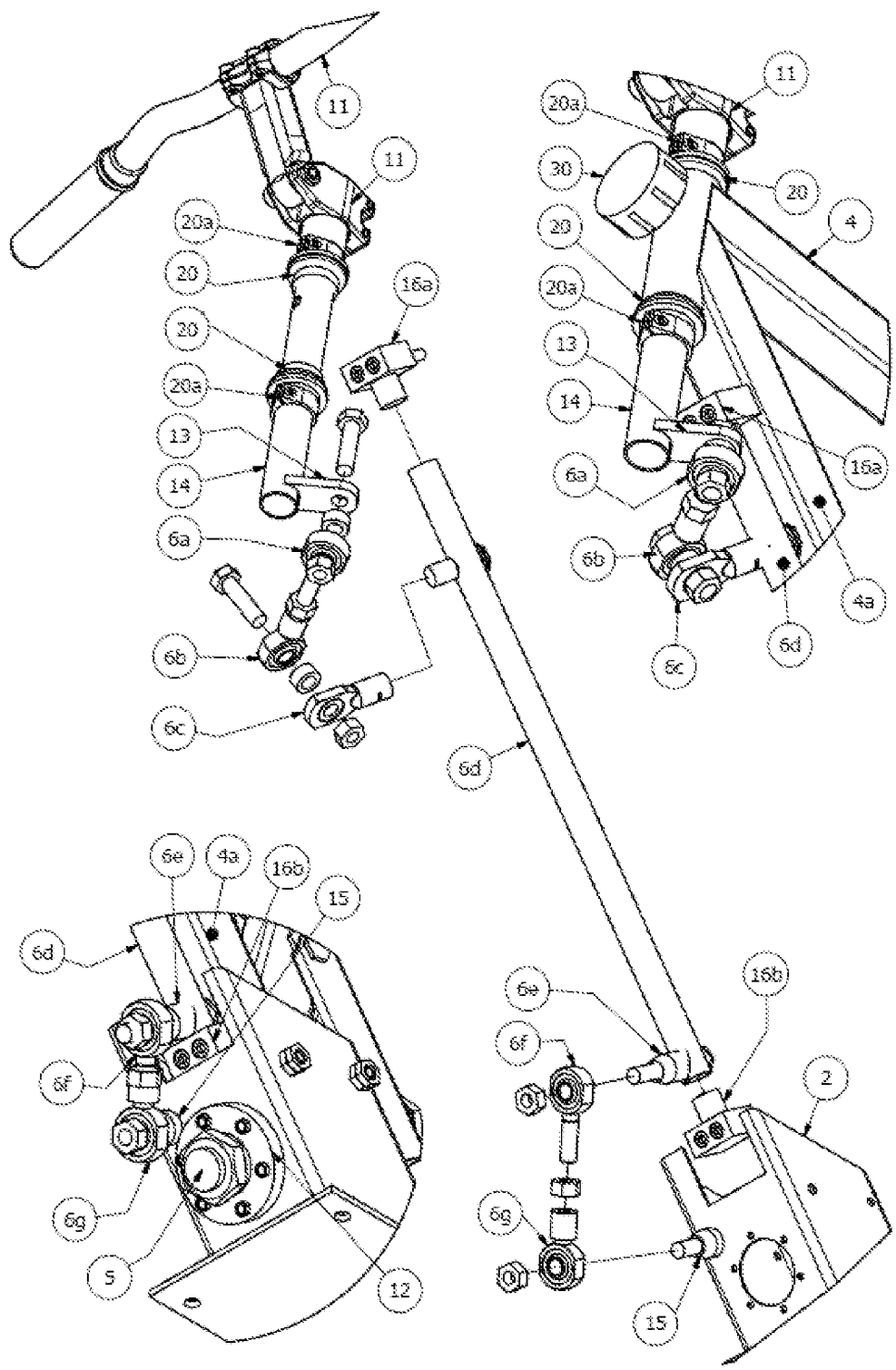
FIG. 6a shows an exploded view of the lateral tilt system and views of the lower and upper elements of the lateral tilt system.

FIG. 6a discloses the technical elements comprising the lateral tilt system (6). This system allows the user to turn the bicycle to the left or right with the handlebars (11) with different degrees of freedom. It is also possible to see that the lateral tilt system comprises as fundamental parts an upper flap (13), two ball joints (6a) and (6b) attached to the upper part, two ball joints (6f) and (6g) attached to the lower part, a rotating tube (6d) with a lever (6c) welded on its upper part, and a lever shaft (6e) welded on its lower part, and a shaft (15) fixed to the mounting base (2). The rotating tube (6d) is joined to the profile (4a) using parts (16a) and (16b). These parts can have at the junction with the rotating tube (6d) bushings or some element that reduces wear.

Functionally, when a turn occurs in the handlebar, a response is generated by the lateral tilt system that allows the movement of the simulator. In that way, when the user turns the handlebar (11), the orientation tube (14) is rotated, and the upper flap (13) is displaced to transfer this movement to the part formed by the ball joints (6a) and (6b). In doing so, the ball joint (6b) pushes the upper lever (6c), which is part of the tube (6d), causing the rotating tube (6d) to rotate on its axis in the opposite direction the handle (11) is turned. Thus, the rotating tube (6d) will rotate to the right if the handle is turned to the left. When the tube (6d) rotates, it also moves laterally the lower lever shaft (6e), which is fixed to it. Then, the lower lever shaft (6e) pulls or pushes the piece formed by the union of the two ball joints (6f) and (6g). In this way, the ball joint (6g) fixed to the shaft (15), which is anchored to the mounting base (2), has no possibility of movement producing a reaction force that forces the profile (4a) connected to the upper (16a) and lower (16b) connecting pieces to move on the main axis (5). Hence, causing the simulator frame (4) to tilt and turn to the right or left. Consequently, turning the handle (11) to the left will cause the simulator to tilt and turn to the left. Likewise, turning the handle (11) to the right will cause the simulator to tilt and turn to the right.

Figure 6B:
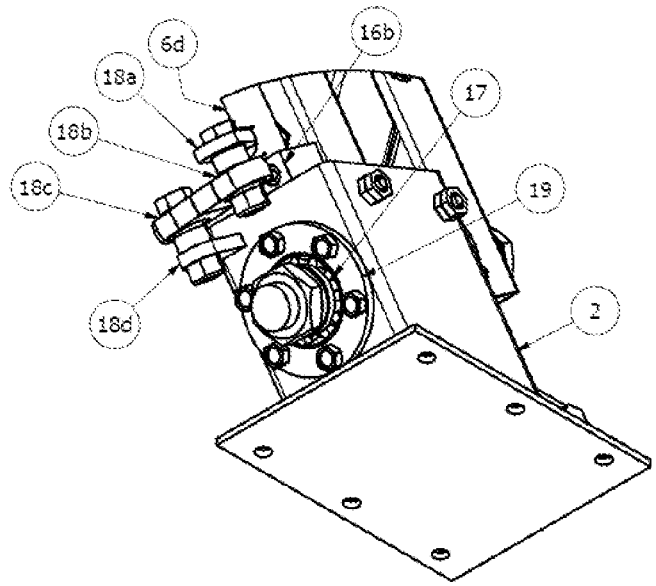
FIG. 6b shows another possible arrangement of the lower elements of the lateral tilt system.
Figure 6B:
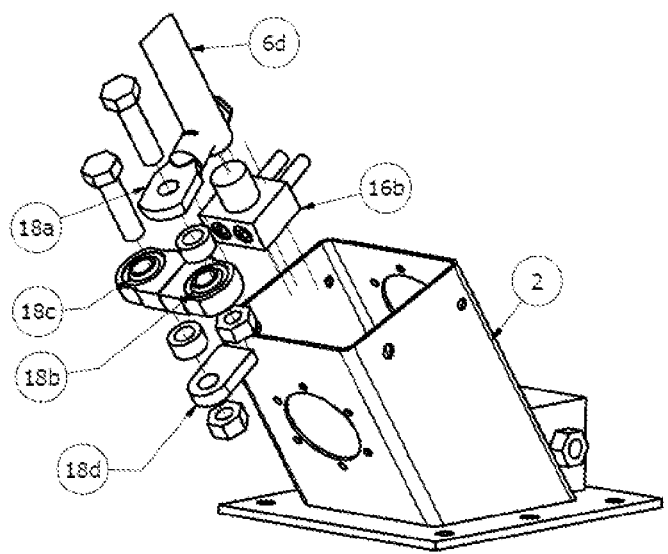

FIG. 6b shows another preferred form of the invention. In this case, the lower lever shaft (6e) can have the shape of the lever (18a) and can be coupled to the ball joint (18b) using a shaft or screw. In that way, the shaft (15) can have the shape of the part (18d) and be coupled to the ball joint (18c) using a shaft or screw. Finally, the ball joints or joint heads (18b) and (18c) can be one piece or be joined by a screw.

It is worth noting that the simulator's turning angles and lateral tilt will depend on the length between the ball joints and the distances from the ball joints to the axes of rotation of each tube, both at the top and at the bottom. Thus, varying any of these distances also changes the lateral tilt angle.

Figure 7:
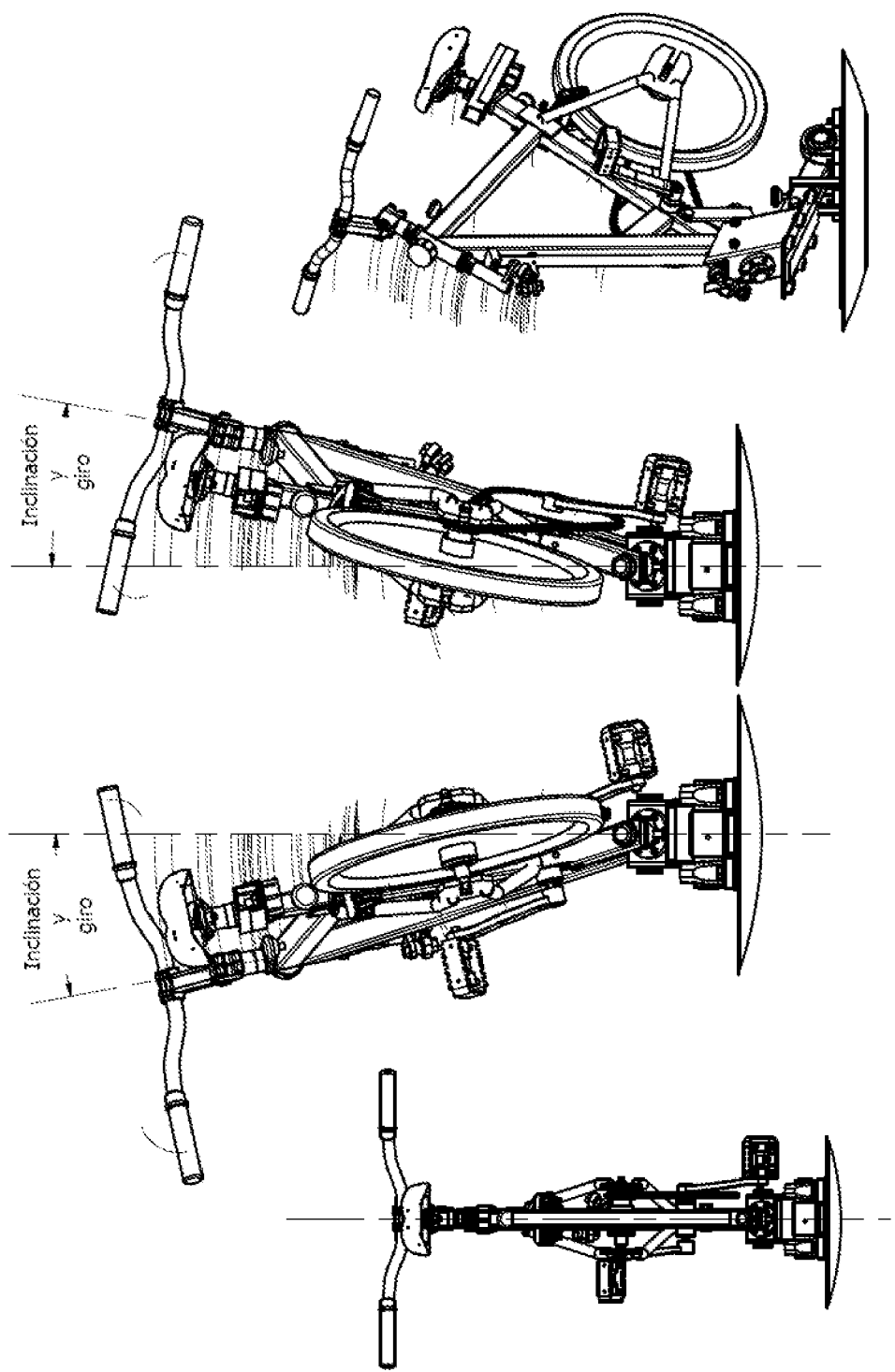
FIG. 7 shows the possible movements that the simulator of the present invention offers to the user.

FIG. 7 shows the possible movements that can be achieved with the cycling simulator of the present invention. Thus, when the user turns the handlebar (11), pushes, or pulls the frame (4) to the right or left, the system can simulate the tilt and turn movements to the right or left. In the same way, the user, by pushing its body backward or jumping and pulling the handlebars towards its body, produces the lifting of the front part of the bicycle while producing or maintaining such lifting. The user can also tilt the simulator to the right or left. Likewise, the simulator allows the user to remain in a neutral position if it wishes to perform the activity without significant effort, turns, or tilts.

In another relevant aspect of the invention, the handlebar (11) of the simulator can comprise different configurations according to the user's personal preference. The first handlebar shown in FIG. 8 consists of a conventional configuration that gives the user the feeling of riding an actual bicycle or motorcycle. For its part, the configuration of the second handlebar, also disclosed in FIG. 8, allows the user to unload its weight when exercising, as occurs with a conventional exercise bike.

The simulator of the present invention can be used to play video games. So, while the frame (4) and the simulator systems can be fitted with sensors, it is possible to locate controls on the handlebars (11) that provide information to a computer via a control card. In this way, the user experiences more realistic sensations when playing video games.

Figure 8:
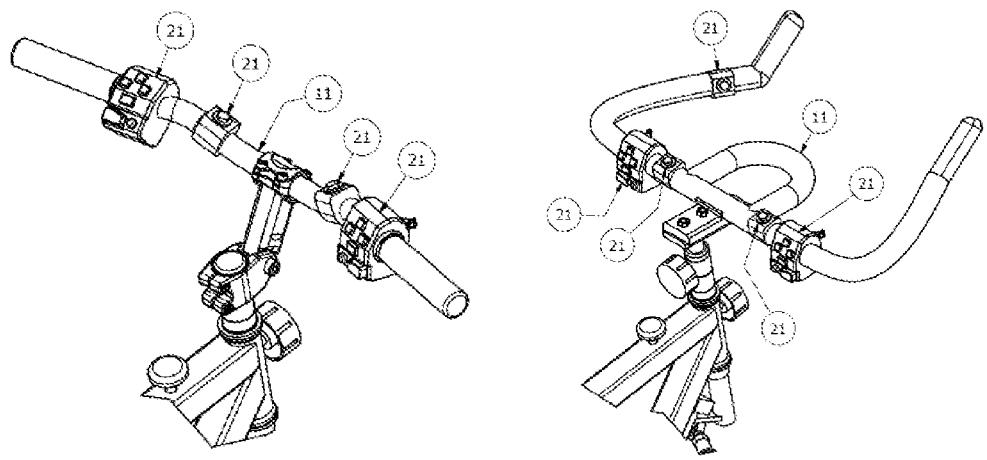
FIG. 8 discloses possible configurations of the handle (11).

In FIG. 8, it is possible to observe that the handlebar can have different button boxes (21) for video game control.

Figure 9:
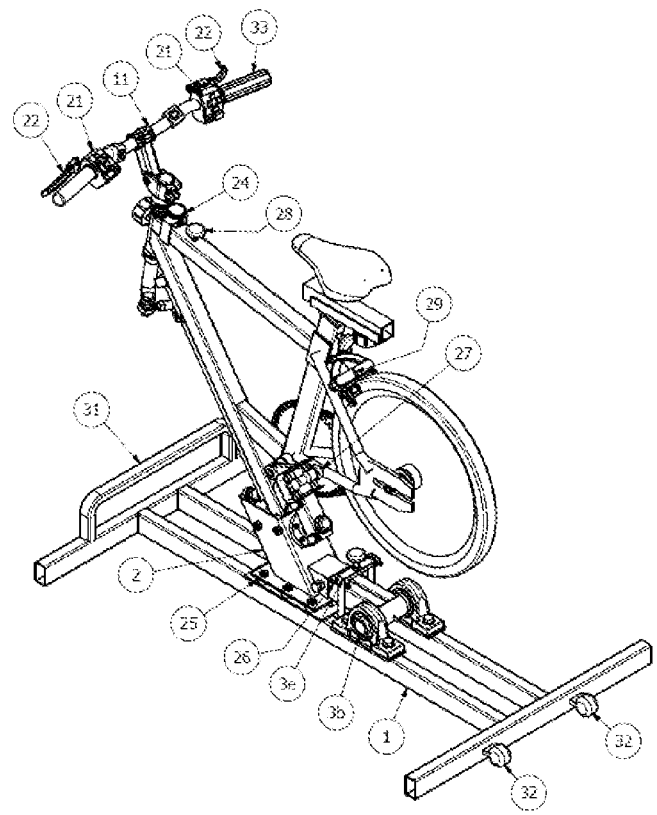
FIG. 9 shows a preferred embodiment of the invention in which two brakes (22), an accelerator handle (33), and sensors are adapted to the simulator for playing video games.

FIG. 9 shows another preferred embodiment of the invention in which two brakes (22) are adapted at both ends of the handlebar (11), and an accelerator handle (33) is coupled at one end. These brakes and throttle handles are characterized by sensors that simulate braking in a bicycle video game or clutch and acceleration in a motorcycle game. To give a realistic feel to the game, the brakes (22) may have housings similar to conventional bicycle brakes, just as the throttle handle can be that of a conventional motorcycle.

FIG. 9 also shows some possible sensors and locations that allow the simulator of the invention to play video games on some device that displays the video images, such as a screen, a cellphone, a virtual reality headset, etc. Thus, the steering control sensor (24) may include a potentiometer with geared wheels, and these are attached to the handlebars. In that way, when the user turns the handlebars (11), the gear wheel of the handlebars turns that of the potentiometer signaling video game to make a turn. Another sensor (25) can indicate when the mounting base (2) separates from the base (1) to interpret a jump in the video game. It is also possible to include a lifting sensor (26), which can be located on the adjustment bracket (3e) or the rotating shaft (3b) that sends signals to the time videogame to keep the simulator lifted backward. It is possible to add pedaling sensors (27) to send different signals depending on whether the user pedals forward or backward. A multiplicity of sensors not shown in FIG. 9 can be arranged to send signals to the video game when the simulator is at full left or right tilt.

Accessory transport elements in FIG. 9 also disclose possible handles (31) and transport wheels (32). Both accessories allow easy transport of the simulator. At the same time, the handles (31) are connected to the base (1) and allow the simulator to be lifted. The transport wheels (32) allow the invention to be moved without the need to lift it.

The embodiments of the invention described here do not limit the invention to any embodiment or collection of specific features throughout the specification. It should be noted by people skilled in the art that various modifications and changes can be made to particular exemplified embodiments without diverging from the scope and intent of the present invention.

The invention claimed:

1. A simulator for recreation and physical exercise that allows lateral and backward movements and inclinations, the simulator comprises:
   a. a base which supports the simulator and is formed by profiles coupled under a mounting base;
   b. the mounting base is arranged on the base and comprises one or more profiles, holes and openings that allow coupling of a lifting system, a central shaft, and a lateral tilting system, wherein the one or more profiles form an inclined box shape;
   c. the lifting system comprising a lifting profile attached to a rotating shaft and bushings or bearings positioned within supports or bearings located at ends of the rotating shaft;
   d. a frame comprising a handlebar and connecting profiles including a profile A and a profile B;
   e. a lower coupling system including the central shaft passing through lower ends of the profiles A and B, also including bushings or bearings allowing movement of the central shaft; and
   f. the lateral tilting system allows a user to turn the simulator to the left or right and comprises an upper flap attached toe a lower part of an orientation tube, a rotating tube having an upper lever and a lower lever attached perpendicularly at its ends, respectively, upper ball joints, or joint heads attached to the upper flap and to the upper lever of the rotating tube, and lower ball joints or joints heads coupled to a lower shaft or coupling anchored to the mounting base and to the lower lever of the rotating tube.

2. The simulator of claim 1, wherein the profiles of said base comprise two metal profiles parallel to each other that are joined perpendicularly at each end to two other metal profiles.

3. The simulator of claim 1, wherein the mounting base has on a rear face a lower cavity with a frame protruding from the mounting base for the coupling of the lifting system, a circular hole above the cavity to adjust the central shaft, and the mounting base includes on a front face a hole for adjusting of the central shaft.

4. The simulator of claim 1, wherein the profile A of the frame is coupled inside the mounting base and is anchored to the central shaft, wherein profile B is coupled to the central shaft outside the mounting base to a profile C.

5. The simulator of claim 1, wherein the frame comprises pedals and a rear resistance element, wherein the rear resistance element is attached by chain or belt transmission to the pedals and generates resistance when pedaling.

6. The simulator of claim 5, wherein the rear resistance element comprises a flywheel, a disc, a roller, a wheel, gear wheels, or any combinations thereof.

7. The simulator of claim 1, wherein the frame comprises lateral shock absorbers chosen between springs or elastomers that are located on lower sides of the lower end of said profile A.

8. The simulator of claim 1, wherein the central shaft of the lower coupling system forms a fixed angle with respect to the base in a range of 25 to 45 degrees when the mounting base is positioned on the base without forming any angle of elevation, and wherein the fixed angle varies when the lifting system lifts the mounting base.

9. The simulator of claim 1, wherein the upper ball joints or joint heads of the lateral tilting system are fitted at one end to the upper flap and at another end to the upper lever of the rotating tube.

10. The simulator of claim 1, wherein the lower ball joints or joint heads of the lateral tilting system fit at one end into the lower lever of the rotating tube and at another end is coupled to the lower shaft.

11. The simulator in claim 1, wherein the lower ball joints or joint heads of the lateral tilting system fit at one end into the lower lever of the rotating tube, and at another end is coupled to the coupling anchored to the mounting base.

12. The simulator of claim 1, wherein the rotating tube of the lateral tilting system is located parallel to the profile A and is coupled to the profile A using upper and lower connecting pieces that are anchored to the profile A, in which said upper and lower connecting pieces have bushings or bearings.

13. The simulator of claim 1, further including control elements that enable the user to employ the simulator in a video game, wherein said control elements include at least one of a button box, brakes, a throttle handle, a steering control sensor, motion and tilt sensors, pedal sensor, or a braking motor.

14. The simulator of claim 1, wherein the mounting base has holes for attaching shock absorbers, and wherein the holes are located in a lower part of the mounting base and allow attaching the mounting base to the base for disabling or removing the lifting system.

15. The simulator of claim 1, wherein the handlebar is either fixed to the frame or fixed with the knob to the frame to prevent rotation of the handlebar if the lateral tilting system is removed.

16. The simulator of claim 1, wherein the lifting system includes a support structure attached to the base and arranged around the lifting profile.

* * * * *